United States Patent
Ward

(10) Patent No.: US 11,783,796 B2
(45) Date of Patent: Oct. 10, 2023

(54) SYSTEM AND METHOD FOR COMPENSATION OF REFLECTION ON A DISPLAY DEVICE

(71) Applicant: Faurecia IRYStec Inc., Montreal (CA)

(72) Inventor: Greg Ward, Berkeley, CA (US)

(73) Assignee: Faurecia IRYStec Inc., Montreal (CA)

( * ) Notice: Subject to any disclaimer, the term of this patent is extended or adjusted under 35 U.S.C. 154(b) by 0 days.

(21) Appl. No.: 17/671,492

(22) Filed: Feb. 14, 2022

(65) Prior Publication Data

US 2022/0208144 A1 Jun. 30, 2022

Related U.S. Application Data

(63) Continuation of application No. 16/471,156, filed as application No. PCT/CA2017/051526 on Dec. 18, 2017, now Pat. No. 11,250,811.

(60) Provisional application No. 62/436,667, filed on Dec. 20, 2016.

(51) Int. Cl.
  *G09G 5/10* (2006.01)
  *G06T 7/514* (2017.01)
  *G06T 7/70* (2017.01)

(52) U.S. Cl.
  CPC ............... *G09G 5/10* (2013.01); *G06T 7/514* (2017.01); *G06T 7/70* (2017.01); *G06T 2207/30201* (2013.01); *G09G 2320/0686* (2013.01); *G09G 2320/08* (2013.01); *G09G 2354/00* (2013.01); *G09G 2360/144* (2013.01)

(58) Field of Classification Search
  CPC .... G09G 5/10; G09G 2360/144; G06T 7/514; G06T 7/70
  See application file for complete search history.

(56) References Cited

U.S. PATENT DOCUMENTS

| | | |
|---|---|---|
| 5,442,484 A | 8/1995 | Shikawa |
| 5,854,661 A | 12/1998 | Kochanski |
| 6,411,306 B1 | 6/2002 | Miller et al. |
| 7,545,397 B2 | 6/2009 | O'Dea et al. |
| 8,559,753 B2 | 10/2013 | Cramblitt |
| 11,250,811 B2 | 2/2022 | Ward |

(Continued)

FOREIGN PATENT DOCUMENTS

| | | |
|---|---|---|
| JP | 2009031337 A | 2/2009 |
| JP | 2009244700 A | 10/2009 |

(Continued)

OTHER PUBLICATIONS

International Search Report corresponding to International Application No. PCT/CA2017/051526, dated Feb. 23, 2018, 3 pages.

(Continued)

*Primary Examiner* — Hang Lin

(74) *Attorney, Agent, or Firm* — REISING ETHINGTON P.C.

(57) ABSTRACT

A system and method for compensating for reflections caused by light-generating objects in the scene facing a display device includes capturing images of the scene. Reflection-inducting zones corresponding to the light generating objects are identified from the captured images. The reflection effect on the display device from the reflection-inducing zones are estimated. A target image to be displayed on the display device is adjusted based on the estimated reflection effect.

17 Claims, 20 Drawing Sheets

(56) References Cited

U.S. PATENT DOCUMENTS

| | | | |
|---|---|---|---|
| 2004/0070565 A1* | 4/2004 | Nayar | G09G 3/003 |
| | | | 345/156 |
| 2010/0249953 A1* | 9/2010 | Kishita | G05B 19/0426 |
| | | | 700/12 |
| 2012/0229487 A1 | 9/2012 | Samanta | |
| 2013/0251288 A1 | 9/2013 | Kobiki | |
| 2015/0091792 A1 | 4/2015 | Koo | |
| 2016/0054175 A1* | 2/2016 | Jia | G01J 1/0233 |
| | | | 250/216 |

FOREIGN PATENT DOCUMENTS

| | | |
|---|---|---|
| JP | 2015022525 A | 2/2015 |
| JP | 2015222316 A | 12/2015 |
| WO | 2014027569 A1 | 2/2014 |

OTHER PUBLICATIONS

Written Opinion corresponding to International Application No. PCT/CA2017/051526, dated Feb. 23, 2018, 4 pages.

Japanese Office Action corresponding to Japanese Application No. 2019-533169, translated into English, dated Aug. 31, 2021, 6 pages.

* cited by examiner

SYSTEM AND METHOD FOR COMPENSATION OF REFLECTION ON A DISPLAY DEVICE

TECHNICAL FIELD

The technical field generally relates to performing digital image processing to compensate for the reflection of one or more specular reflections within an ambient environment.

BACKGROUND

When light interacts with the display device of a mobile device, the light may be reflected in multiple ways. For example, reflectance can be quantified in terms of diffuseness of reflection, varying between fully diffuse to fully specular. For example, shining a spot light on a perfect mirror will provide only specular reflection such that the spot light will only be visible in the reflected image when the mirror is displayed from an angle complimentary to the angle of the spot light. That is, if the spot light is located to the left of center of the mirror and shown onto the mirror from 45 degrees, the spot light will only be visible when it is viewed by an observer located 45 degrees to the right of the mirror. On the other hand, diffuse surfaces will accept light and reflect it in all angles. Therefore, if a spot light is shown on a fully diffuse surface, some of the light from the spotlight can be viewed from all angles with the reflector appearing bright that it does when the spotlight is not illuminating the diffuser. Most displays are not perfect mirror or perfect diffusers, but instead reflect some light specularly, like the mirror, and some light diffusely. The total reflection, including both the diffuse and specular reflection provided by the display can be characterized using the bidirectional reflection distribution function.

Modern display devices, especially those found on mobile devices, tend to show specular reflections in high-ambient lighting situations. As seen in FIGS. 1A and 1B, such reflections make it difficult to view content, and the shifting highlights corresponding to background changes and screen tilting further confounds a person's view, particularly for video.

A commonly applied method to mitigate the effect of ambient involves raising the black level, but this only serves to further undermine contrast and does little to compensate for the confound between displayed content and reflected background information.

Compensation for low-light conditions can be achieved by manipulating color and tone-mapping appropriately. However, bright ambient environments pose a number of difficulties, including screen reflections, surrounding glare, and limited display brightness. To some extent, the first two problems can be solved by eliminating the third one, i.e., creating a brighter display to overcome the ambient environment. The unacceptable price in a mobile device is power consumption, but for automotive, it is mostly a question of technological limits. Displays only get so bright before special cooling is required with the latest LED-backlit LCD or OLED panels. Furthermore, such adjustment better addresses diffuse reflection than specular reflection Nevertheless, increasing brightness will probably be the first resort to address readability issues in automotive displays. See, for example, U.S. Pat. Nos. 6,411,306, 7,545,397.

Reducing screen reflection is another well-known approach, typically using low-reflectance coatings. While strides have been made in thin-film coatings for touch screens, and meta-materials hold promise for further improvements, screen reflections will never be eliminated completely when illumination sources are orders of magnitude brighter than the display. A specular reflectance as low as 0.01%, which is an order of magnitude better than any existing coatings, will result in indirect solar reflections (bounced off a car, a pane of glass, or body of water) above 10,000 nits. The problem is simply too large to go away under all conditions.

SUMMARY

According to one aspect, there is provided a method for compensating for reflection on a display device. The method incudes capturing one or more images of a scene facing the display device, identifying from the captured images one or more reflection-inducing zones located within the scene facing the display device, determining specular reflection effect on the display device caused by the reflection-inducing zones, and adjusting a target image to be displayed on the display device based on the determined reflection effect.

According to various aspects, a computer-implemented system includes at least one data storage device; and at least one processor operably coupled to the at least one storage device, the at least one processor being configured for performing the methods described herein according to various aspects.

According to one example embodiment, a computer-implemented system includes at least one data storage device and at least one processor operably coupled to the at least one storage device, the at least one processor being configured for: receiving one or more captured images of a scene facing the display device; identifying from the captured images one or more reflection-inducing zones located within the scene facing the display device; determining specular reflection effect on the display device caused by the reflection-inducing zones; and adjusting a target image to be displayed on the display device based on the determined specular reflection effect.

According to various aspects, a computer-readable storage medium includes computer executable instructions for performing the methods described herein according to various aspects.

BRIEF DESCRIPTION OF THE DRAWINGS

For a better understanding of the embodiments described herein and to show more clearly how they may be carried into effect, reference will now be made, by way of example only, to the accompanying drawings which show at least one exemplary embodiment, and in which.

Figure 1A:
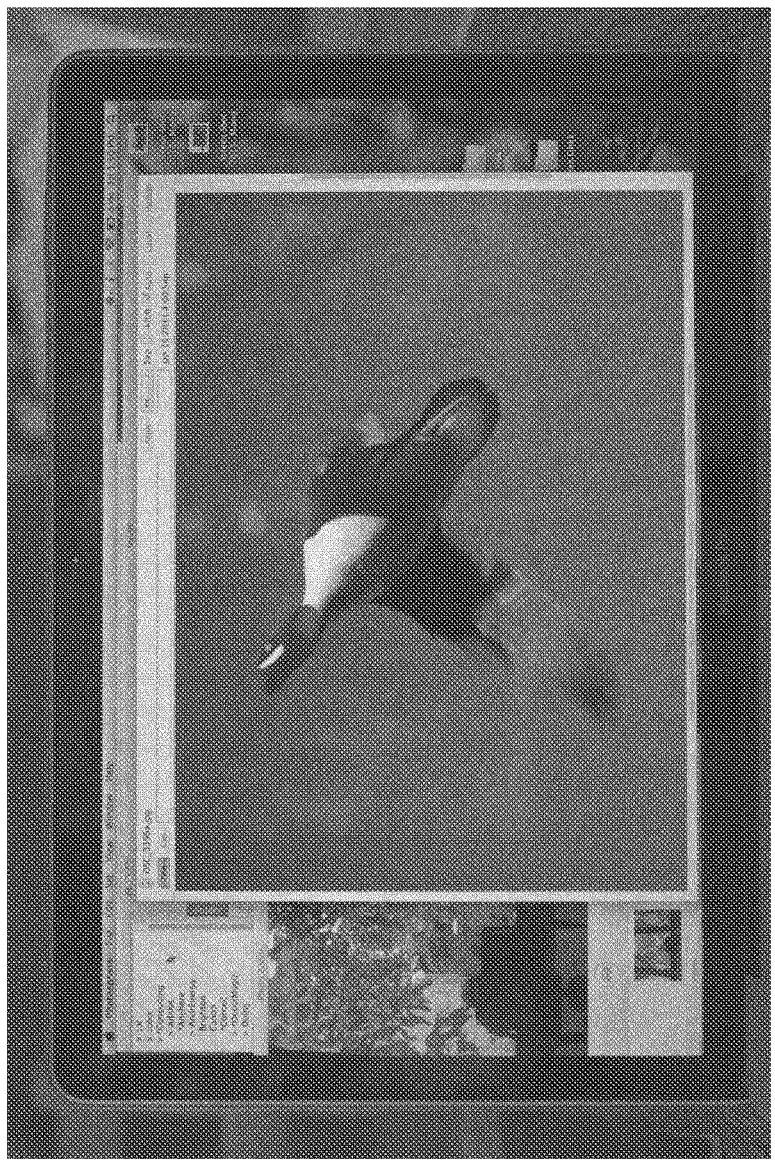
FIG. 1a illustrates a first sample image showing reflection effect on the display device caused by a window in the scene facing the display device.

It will be appreciated that for simplicity and clarity of illustration, elements shown in the figures have not necessarily been drawn to scale. For example, the dimensions of some of the elements may be exaggerated relative to other elements for clarity.

DETAILED DESCRIPTION

Broadly described, various example embodiments described herein provide for a system and method for compensating for reflections caused by light-generating objects in the scene facing a display device by capturing images of the scene, identifying in the images reflection-inducing zones corresponding to the light generating objects, estimating the reflection effect on the display device from the reflection-inducing zones and adjusting a target image to be displayed based on the estimated reflection effect. The reflection-inducing zones may be zones that cause specular reflection and the estimating estimates the specular reflection effect on the display device.

One or more reflection compensation systems and methods described herein may be implemented in computer programs executing on programmable computers, each comprising at least one processor, a data storage system (including volatile and non-volatile memory and/or storage elements), at least one input device, and at least one output device. For example, and without limitation, the programmable computer may be a programmable logic unit, a mainframe computer, server, and personal computer, cloud based program or system, laptop, personal data assistance, cellular telephone, smartphone, wearable device, tablet device, virtual reality devices, smart display devices (ex: Smart TVs), set-top box, video game console, or portable video game devices.

Each program is preferably implemented in a high level procedural or object oriented programming and/or scripting language to communicate with a computer system. However, the programs can be implemented in assembly or machine language, if desired. In any case, the language may be a compiled or interpreted language. Each such computer program is preferably stored on a storage media or a device readable by a general or special purpose programmable computer for configuring and operating the computer when the storage media or device is read by the computer to perform the procedures described herein. In some embodiments, the systems may be embedded within an operating system running on the programmable computer. In other example embodiments, the system may be implemented in hardware, such as within a CPU or video card (GPU).

Furthermore, the systems, processes and methods of the described embodiments are capable of being distributed in a computer program product comprising a computer readable medium that bears computer-usable instructions for one or more processors. The medium may be provided in various forms including one or more diskettes, compact disks, tapes, chips, wireline transmissions, satellite transmissions, internet transmission or downloadings, magnetic and electronic storage media, digital and analog signals, and the like. The computer-usable instructions may also be in various forms including compiled and non-compiled code.

The one or more reflection compensation system and methods described herein is applied where an image or video (hereinafter referred to as a "target image") is to be displayed on an electronic display device. Without limitation, the electronic display device may be a computer monitor, a screen of mobile device (ex: tablet, smartphone, laptop, wearable device), a screen of video game console, a TV, etc. The display device may be implemented using display technologies such as OLED, LCD, quantum dot display, laser projector, CRT, etc.

Figure 1B:
FIG. 1b illustrates a second sample image showing reflection effect on the display device caused by a window in the scene facing the display device.

FIGS. 1*a* and 1*b* show a first and second sample image representing a common reflection problem. Light-generating objects in the area facing the display device causes reflection on the display device that appear as whitish highlights on the display device.

Figure 2:
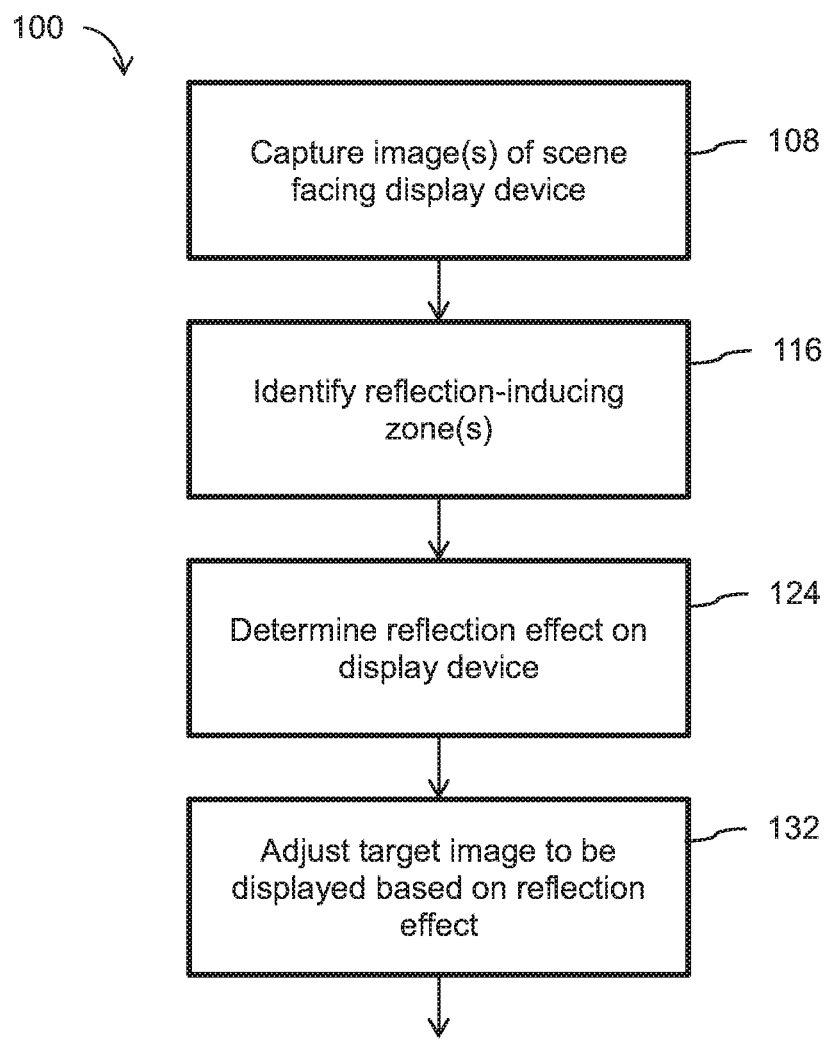
FIG. 2 illustrates a flowchart of the operational steps of an example method for compensating for reflection on a display device.

Referring now to FIG. 2, therein illustrated is a flowchart of the operational steps of an example method 100 for compensating for specular reflection on a display device.

At step 108, one or more images of a scene facing the display device is captured. The display device is to be used to display one or more target images. The scene facing the display device corresponds to the environment in front of the display device.

Any object in the scene that emits light that causes specular reflection on the display device is referred herein generally as a "light-generating object". It will be understood that the light-generating object may directly emit light that causes specular reflections, or the light-generating object may be reflecting light from an external source, the reflected light further causing specular reflections on the display device.

The one or more images may be captured sequentially, such as in a video. Accordingly, the scene being captured in the images may change over the sequence, such as due to a change in orientation of the image capture device or changes to objects in the scene.

The one or more images of the scene can be captured by an image capture device. The image capture device may be positioned to be offset by a known distance and orientation from the display device. Preferably, the image capture device is located in proximity of the display device and is facing the same direction as the display device. For example, the image capture device may be an external camera positioned in proximity of the display device. Alternatively, the image capture device may be an embedded camera, such as the front facing camera of a mobile device (smartphone, tablet, laptop with webcam, video game console, etc.).

The image capture device may be a combination of capture devices, such as a combination of a camera and an ambient light sensor. Preferably, the camera and the ambient light sensor are located in proximity of one another such that a scene captured by the camera substantially corresponds to the scene captured by the ambient light sensor. It will be appreciated that various mobile devices are now offered with both a camera and an ambient light sensor.

In some example embodiments, the image capture devices may have two or more cameras, which may be operated to capture the scene while providing depth information of objects within the scene (ex: stereoscopic cameras). An additional device operable to determine depth, such as a time-of-flight sensor, can also be used.

The images captured of the scene may be down-sampled to a lower resolution, which may improve processing speed. It will be appreciated that steps described herein that operate on captured images of the scene facing the display can refer to the down-sampled captured images.

The scene facing the display device represented in the images captured by the image capture device is defined by the field of view of the capture device.

Continuing with FIG. 2, at step 116, one or more reflection-inducing zones located within the one or more captured images are identified. The reflection-inducing zones correspond to light-generating objects in the scene that can cause specular reflections on the display device. Within the captured images, the reflection-inducing zones are areas of the capture images that have a sufficiently high luminance value that indicates bright light-generating objects in the scene.

At step 124, the specular reflection effect on the display device caused by the light-generating objects, and as represented by the reflection-inducing zones in the captured images, are determined. The specular reflection effect represents an estimation of how a viewer viewing the display device would perceive specular reflections caused by light-generating objects in the scene facing the display device.

At step 132, a target image that is to be displayed on the display device is adjusted based on the reflection effect. The target image may be adjusted to reduce or mitigate the reflections perceived by the viewer. The adjustment may include digitally processing the target image.

Figure 3:
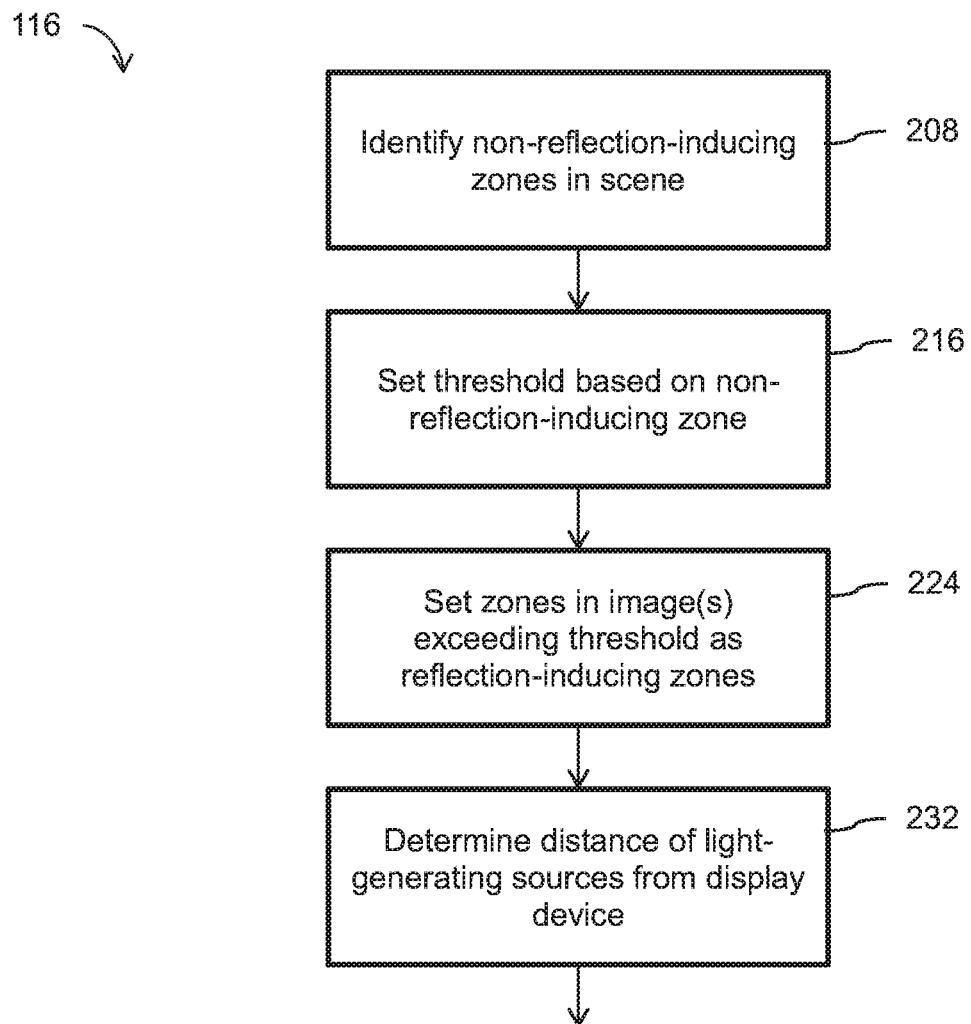
FIG. 3 illustrates a flowchart of the operational steps of an example method for identifying one or more reflection-inducing zones.

Referring now to FIG. 3, therein illustrated is a flowchart of the operational steps of an example method for identifying one or more reflection-inducing zones located within the one or more captured images. The method may correspond to substeps of step 116.

At step 208, an area of the one or more captured images that is not a reflection-inducing zone is identified. This zone corresponds to a part of the scene facing the display device that will not cause significant specular reflections to be perceived by the viewer.

In one example, the face of the viewer is captured within the images of the scene facing the display device and zone of the images corresponding to a portion of the face of the viewer is used as a reference area to set a threshold for identifying reflection-inducing zones of the captured images. For example, an area of the face corresponding to the bridge of the viewer's nose may be used. The area may also include parts of the forehead and portions of each eye of the user.

At step 216, a threshold for determining reflection-inducing zones is set. The threshold may be set as a luminance value that is a multiple (ex: 100 times) of the average of the luminance values of the pixels forming the reference area within the captured images. Alternatively, or additionally, the threshold may be set as a factor of a maximum image value (ex: high luminance in the reference area such that the threshold exceeds maximum luminance pixel values).

At step 224, the areas of the captured image that have luminance values that exceed the threshold are determined to be reflection-inducing zones. In one example, a smoothing or dilating may be applied to remove reflection-inducing zones below a certain size.

At step 232, the distances of each light-generating object represented by the reflection-inducing zones from the display device are determined. That is, for each reflection-inducing zone identified from step 224, the distance of the real-life light-generating object represented by that reflection-inducing zone is determined.

According to one example, the distances of each light-generating object may be determined from known properties of the scene facing the display device. This may be the case where the scene is fixed relative to the display device. The location of each light-generating object in the scene, including their distance from the display device, can be predefined and the identified reflection-inducing zones are matched to its corresponding light-generating object.

For example, a display device, such as computer monitor or a TV may be in a fixed position in a space, such as within a room, and light-generating objects found within the space (ex: walls, windows, light fixtures, lamps) are predefined. The display device in a fixed position may be an electronic billboard or other display device positioned in a public space.

For example, a display device may be in a fixed position inside the interior cabin of an automobile and light-generating objects of the cabin (ex: windows of the vehicle, lights inside the cabin) are predefined. It will be appreciated that although the automobile is movable, the display device remains in a fixed position relative to the interior of the cabin.

In one or more examples, properties of the scene, such as location and brightness of light-generating objects, may be known ahead of time. For example, such properties may be pre-measured and pre-stored.

According to one example embodiment, the distance of light-generating objects within the scene from the display device is determined from sensed motion of the display device and the movement of reflection-inducing zones within images captured of the scene as the display device is moved. The distance of the light-generating objects can be calculated based on parallax effect.

The determining of distances of light generating objects within the scene may take into account the offset of the image capture device from the display device. Additionally or alternatively, the determining of the distances of the light generating objects within the scene may take into account the position of the viewer, such as the viewer's eyes.

Figure 4:
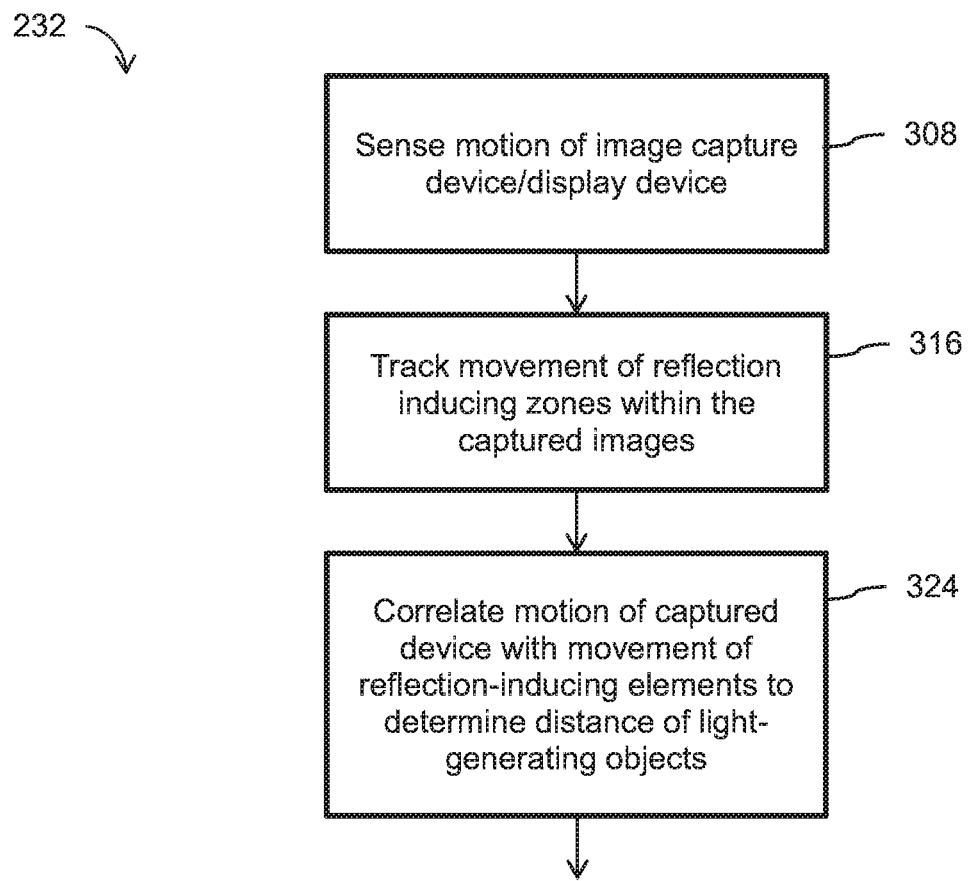
FIG. 4 illustrates a flowchart of the operational steps of an example method for determining distance of light generating objects in the scene from the display device.

Referring now to FIG. 4, therein illustrated is a flowchart showing the operational steps of an example method 232 for determining distance of light-generating objects in the scene from the display device.

At step 308, the motion of the image capture device is sensed. The motion may be sensed by a sensor external to the image capture device but that is representative of the motion of the image capture device. For example, where the display device is a mobile device (ex: smartphone, tablet, laptop, portable video console), the motion may be sensed with a motion sensor of the mobile device, such as a gyroscope. As the image capture device is being moved, a plurality of images of the scene facing the image capture device is captured.

At step 316, the movement of reflection inducing zones within the scene is determined from the plurality of images of the scene captured during movement of the image capture device.

At step 324, the sensed motion of the image capture device is correlated within the determined movement of reflection inducing zones to determine the distance of light-generating objects represented by the reflection inducing zones from the display device.

According to one example embodiment, lateral movement of the image capture device is sensed. Furthermore, edges of the reflection-inducing zones that are approximately perpendicular to the direction of motion are identified. The movement of the edges within the scene represented by the plurality of captured images are identified. Movement of edges that are counter to the sensed motion is ignored. Edges with least amount of movement within the captured scene are determined to be located at a higher distance (ex: infinity) from the display device. Edges with greater motion are determined to be closer to the display device.

According to various example embodiments, occlusion objects within the scene are also detected. Occlusion objects correspond to objects located between a light-generating object and the display device and acts to block some of the reflection exhibited on the display device.

Figure 5:
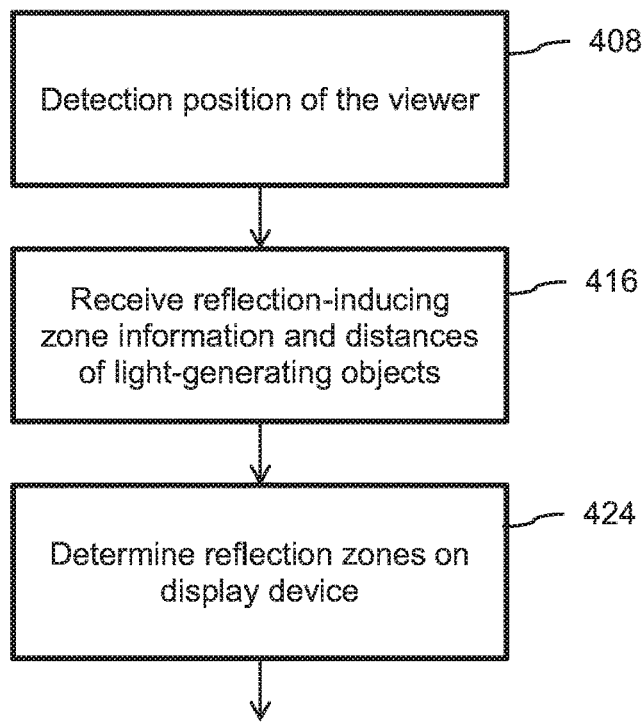
FIG. 5 illustrates a flowchart of the operational steps of an example method for determining the reflection effect on the display device.

Referring now to FIG. 5, therein illustrated is a flowchart of the operational steps of an example method 124 for determining the reflection effect on the display device caused by the reflection-inducing zones identified at step 116.

At step 408, the position of a viewer viewing the display device is determined. Object recognition of the images captured of the scene facing the display device can be performed to recognize the viewer. In one example, the eyes of the viewer are located. The position of the viewer can be tracked over time.

At step 416, the reflection-inducing zones identified at 116 and distance of each light-generating objects represented by the reflection-inducing zones are received.

At step 424, reflection zones are determined based on the position of the viewer and information pertaining to the reflection-inducing zones and distances of the corresponding light-generating objects from display device. The reflection zones that are determined represent the reflection exhibited on the display device as perceived by the user caused by light-generating objects in the scene. It will be appreciated that the reflection zones may cover only a portion of the area of the display device. For example, some areas of the display device do not correspond to a reflection-inducing zone and therefore are determined to not exhibit reflection.

Figure 6:
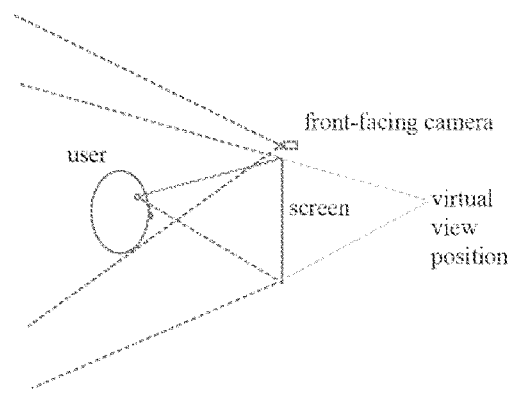
FIG. 6 illustrates a schematic diagram showing the relative positions of a viewer, the display device, and an image capture device.

Referring now to FIG. 6, therein illustrated is a schematic diagram showing the relative positions of a viewer, the display device and an image capture device. It will be understood that reflections on the display device perceived by the viewer correspond to the viewer's view of light-generating objects in the scene as seen from the virtual view position, which corresponds to the position of the viewer's eyes mirrored over the display device. However, the image capture device that captures images of the scene is offset from the virtual view position. Accordingly, an extrapolation is applied to determine how light-generating objects represented as reflection-inducing zones in the images captured would be seen from the virtual view position.

According to one example embodiment, the reflection zones may be represented as a veiling glare in the form of a 2-D array, wherein values in the array define the luminance value of the reflection zones as perceived by the viewer on the display device.

Figure 7:
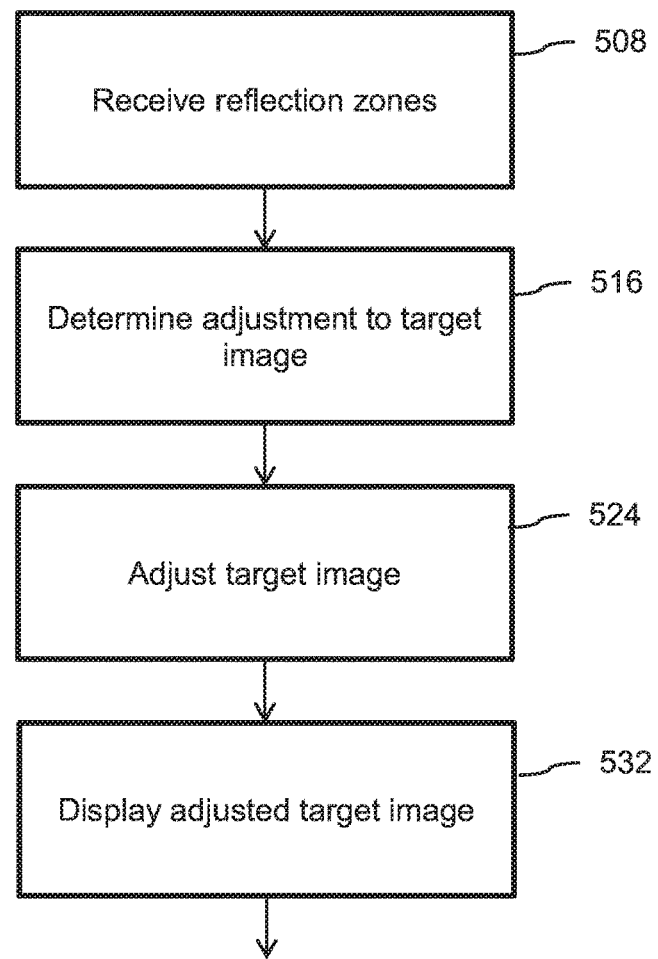
FIG. 7 illustrates a flowchart of the operational steps of an example method for adjusting the target image to be displayed based on the reflection effect.

Referring now to FIG. 7, therein illustrated is a flowchart of the operational steps of an example method 132 for adjusting the target image to be displayed based on the reflection effect.

At step 508, the reflection zones determined at step 424 are received. The veiling glare defining luminance values of the reflection zone is also received.

At step 516, the luminance values of the reflection zone are compared with luminance values of the target image to determine the adjustment to be applied to the target image. For example, the luminance value of the reflection zone at a given area on the display device is compared with luminance value at a corresponding area (when displayed on the display device) of the target image. The comparison of luminance values may be carried out on a pixel-by-pixel basis. Upsampling of the veiling glare may applied.

According to one example embodiment, for one or more subareas of the target image where luminance values of the pixels of the target image are greater than luminance values in corresponding subareas of the reflection zone, the luminance values of the pixels within the one or more subareas are decreased.

For one or more subareas of the target image where luminance values of the pixels of the target image in the subareas are less than luminance values in corresponding subareas of the reflection zone, the luminance values of the pixels within the one or more subareas are increased.

It will be appreciated that this has the effect of reducing luminance values in the target image in areas where the target image already has high luminance values and boosting the luminance values in the target image in areas where the target images does not have luminance values.

Areas of the target image that correspond to areas of the display device that does not exhibit reflection (areas with no reflection zones as determined from steps 116 and 424) are not adjusted.

At step 524, the target image is adjusted according to the adjustment calculated at step 516.

At step 532, the adjusted target image is displayed on the display device.

Example Implementation 1

The basic concept is to take continuous video, ambient light and motion sensor data from a mobile device, and use it to deduce in real-time the current reflections seen by the user on his or her screen. The head position is simultaneously tracked in order to reproject the bright regions as seen by the front-facing camera.

Figure 8A:
FIG. 8*a* illustrates the first sample image showing reflection effect on the display device caused by a window in the scene facing the display device in which compensation for reflection is mismatched.
Figure 8B:
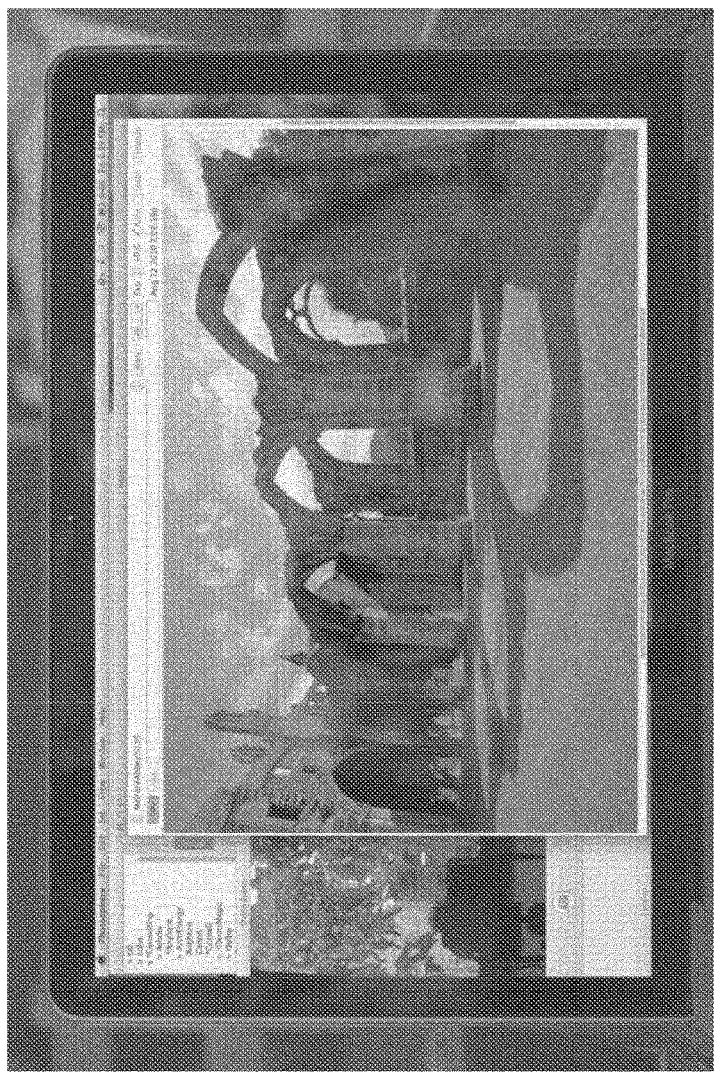
FIG. 8*b* illustrates the second sample image showing reflection effect on the display device caused by a window in the scene facing the display device in which compensation for reflection is mismatched.
Figure 8C:
FIG. 8*c* illustrates the first sample image showing reflection effect on the display device caused by a window in the scene facing the display device in which reflection compensation according to various exemplary embodiments described herein has been applied.
Figure 8D:
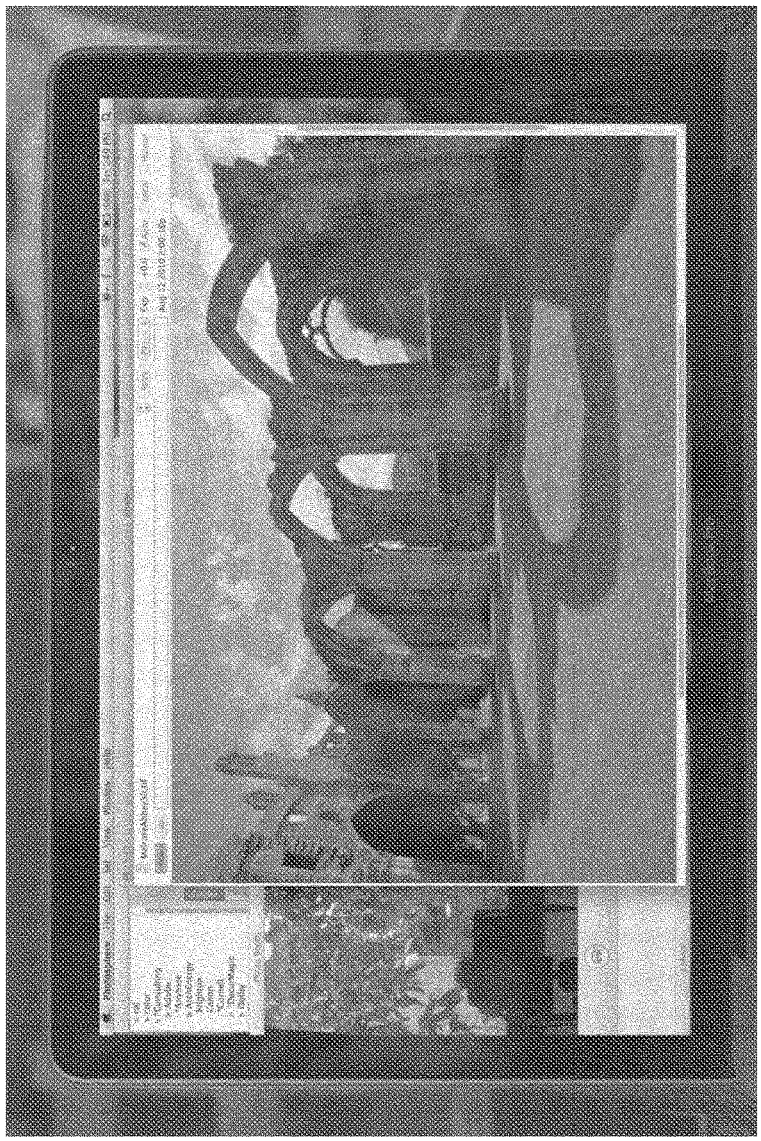
FIG. 8*d* illustrates the second sample image showing reflection effect on the display device caused by a window in the scene facing the display device in which reflection compensation according to various exemplary embodiments described herein has been applied.
Figure 8E:
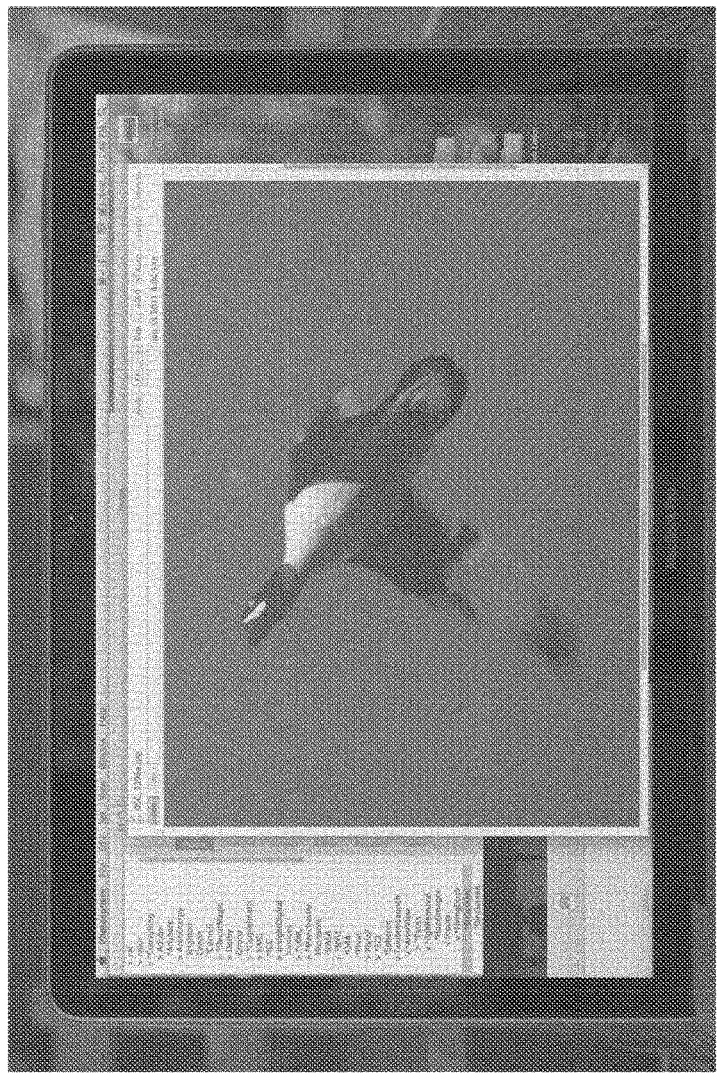
FIG. 8*e* illustrates the first sample image showing reflection effect on the display device caused by a window in the scene facing the display device in which reflection compensation according to various exemplary embodiments described herein has been applied.
Figure 8F:
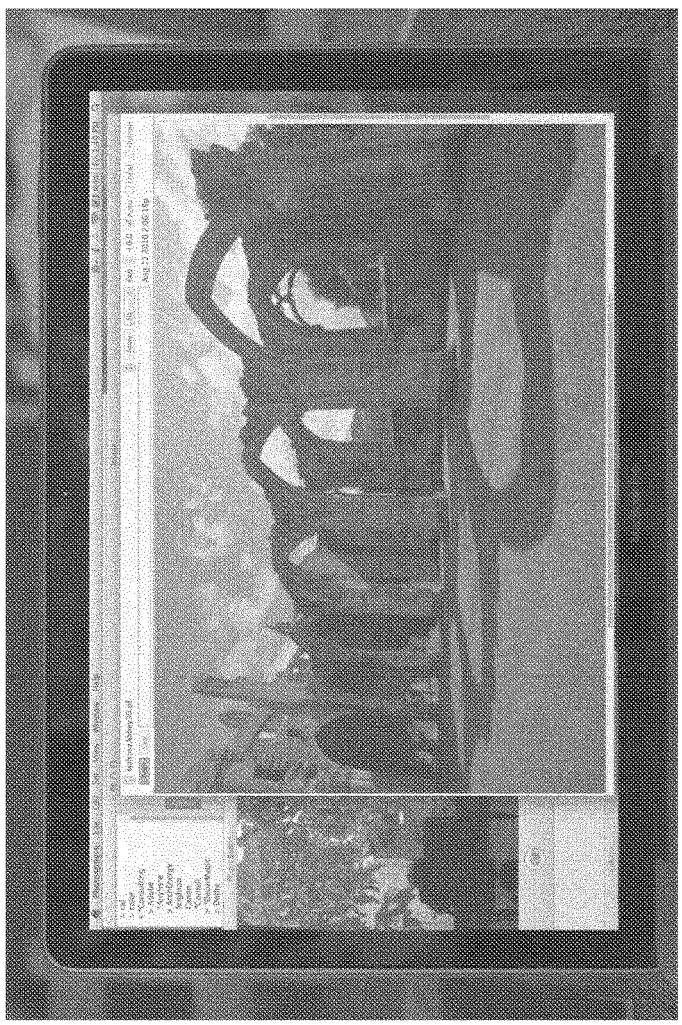
FIG. 8*f* illustrates the second sample image showing reflection effect on the display device caused by a window in the scene facing the display device in which reflection compensation according to various exemplary embodiments described herein has been applied.

The main challenge with veil subtraction lies in the accurate prediction of the reflection image as seen from the viewer's perspective. If the reflection image is in the wrong place, the results may be deteriorated due to subtracting the wrong veil, as shown in FIGS. 8a and 8b. Veil estimation requires (a) knowing where the viewer's eyes are located and (b) knowing the brightness and position of significant reflection sources are, both relative to the display.

In one example implementation, it is assumed that the device being used is equipped with a front-facing camera, an ambient light sensor, and motion sensors to provide when and how the display is moving. These features are typical on mobile devices currently, and are likely to be available with improved specifications in the future, but current capabilities are sufficient. An aim is to keep the computational complexity low as well so as not to tax the CPU, GPU, or battery too heavily.

Figure 9A:
FIG. 9*a* is an image captured of the scene facing the display device.
Figure 9B:
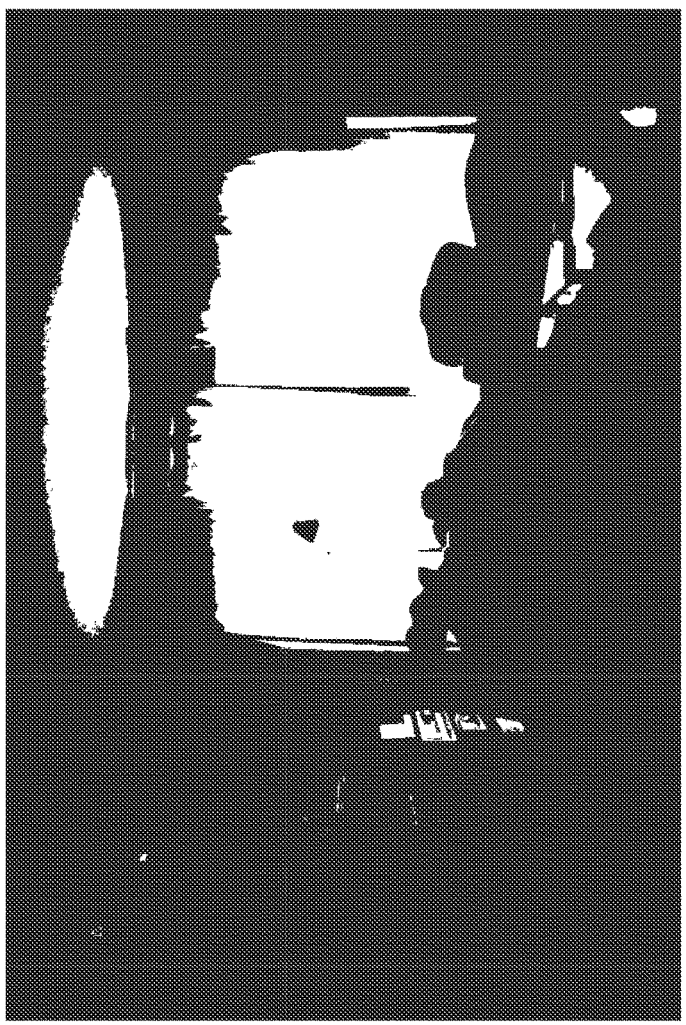
FIG. 9*b* is a mask showing reflection zones (in white) determined from the image of the scene facing the display device.
Figure 10A:
FIG. 10*a* is a third sample image prior to processing.
Figure 10B:
FIG. 10*b* illustrates the third sample image after adjustment for reflection compensation.
Figure 10C:
FIG. 10*c* illustrates the displayed third sample image showing reflection effect and without reflection compensation.
Figure 10D:
FIG. 10*d* illustrates the displayed third sample image in which reflection compensation according to various exemplary embodiments described herein has been applied.

The veil computation proceeds as follows:
Identify (track) head & eye position relative to screen.
  Use intrinsic parameters of front-facing camera and typical human head size to judge distance.
Find edges bordering bright zones in captured image. (See example capture and bright area perimeter bitmap in FIGS. 9a and 9b.) Adjust threshold dynamically based on camera exposure such that regions do not change too greatly in size.
When lateral movement is detected by motion sensors (not rotation), identify edges in the bright area masks that are roughly perpendicular to the direction of motion.
Edges that move strongly in the wrong direction are ignored as they must be moving in the scene. Edges with the least motion are assumed to be at infinity (vanishing point or horizon). Edges with greater motion are assumed to be nearer, and their distance is computed based on parallax against the horizon line and intrinsic camera parameters.
With a build-up of small lateral motions in different directions, gather information and confidence about the distance to these bright area perimeters. Interpolate distances around the perimeter and discard extreme outliers. Result is a set of 3-D contours enclosing highlight regions.
Use ambient sensor to estimate the average brightness of the white (clipped) areas.
Reproject 3-D highlight contours based on estimated head/eye position.
Multiply by screen BRDF (bidirectional reflection distribution function) and blur based on assumed pupil size to get reflection (veil) image estimate.
Apply the highlight mitigation technique(s) as described elsewhere herein, choosing method & strength based on confidence in the reflection estimate.

There are some important advantages to this method.

It can use a standard front-facing camera with exposure set too high to accurately capture the brightness levels, because their intensity from the absolute levels recorded can be estimated from the adjacent ambient sensor.

Rather than solving the full 3-D reconstruction problem, bright area perimeters are used to build up information from the device motion sensors and the unsteady hands of the viewer. Tracking edges perpendicular to motion further reduces errors and avoids the expense of feature matching used in most depth-from-multiview methods.

Reprojection is also simplified, as a small number of discrete positions are moved along a set of 3-D contours and in-filling to estimate new highlights. This is designed as a lightweight process.

One effectively "trains" the user to move the display around a bit to improve the image.

If future front-facing cameras have high dynamic-range capture capacity, the veil image will be further improved.

Highlight Thresholding

One task is to determine which parts of the captured front-camera view constitute possible highlights that will be reflected in the user's screen. A threshold is set empirically based on the captured image pixel value at the bridge of the user's nose. Since it is expected this will be proportional to the viewer's eye adaptation and already in camera brightness units, whatever the exposure happens to be, this serves as a convenient way to set the threshold. A square area equal to the inter-ocular spacing is averaged, which covers most of the nose, some of the forehead, and roughly half of each eye. The highlight threshold is set to a multiple (ex: 100 times) of this average, or a factor (ex: 0.92) of the maximum image value in a [0,1] range, whichever is smaller. Down-sampled capture image pixels that are above threshold using a 2-D bitmap are marked. This bitmap is subsequently eroded and dilated to remove isolated highlights that would be too small to remedy.

Highlight Reprojection

For the reprojection step, the front camera geometry and determined head position is used to extrapolate the view behind the screen that corresponds to the reflected image from the user's perspective. At this stage, distance estimates for all the scene pixels is needed, which is obtained from a call-back function. In the demo for a car, this function will use the mock-up car's window geometry.

The virtual view that would not require any reprojection corresponds to an impossible position behind the display. Reprojecting highlights captured by the front camera depends on the distances to objects in the scene. The distance to the viewer's head outline can be estimated from eye-tracking data, and other distances based on a fixed automobile demo geometry.

The diagram shown also simplifies the problem by showing only one eye. Since it is assumed that the viewer has two eyes, the reprojection is performed twice and overlay the results. A 50% factor may be used for each highlight after normalization based on the ambient sensor value.

To reproject pixels corresponding to different scene distances, pixel areas are opened up, using a quad-filling method. It is understood that there are portions of the reprojected view obstructed by the viewer's head, where the highlights will be uncertain. These will be filled with highlight or non-highlight regions, depending on the boundaries. The final highlight image is then converted to absolute luminance as reflected in the display using a measured screen reflectance value.

Highlight Compensation

A significant problem with veil subtraction is that only so much can be subtracted from an image before "black" is reached, since it is not possible to produce negative light. This is visible in the pinkish remnants of the original highlights in the sky, for example. Fortunately, the eye is fairly forgiving of haze in real life, which is why raising the black level is a reasonable thing to do. Raising the black level in a perception-friendly manner puts more haze towards the top of the image, yielding the headroom needed for greater reflection subtraction. The amount of haze that is added can be adjusted based on the viewing conditions and user preference for optimal results.

Once the highlight luminance as seen by the viewer is estimated, the target display image to minimize degradation needs to be compensated. The overall strategy is to subtract the veil due to highlights where target image values permit, and raise other values as necessary to subtract the veil in target regions that would otherwise be too dark for subtraction. This fits the goal of maintaining local contrast despite highlights, at the expense of manipulating brightness in some highlight regions. The overall effect is an interesting one, which sits visually between emissive and reflective displays. In brighter regions of the target image, where veil subtraction just works, the veil largely disappears and colors are restored. In darker regions, the image highlight is like dappled light on a reflection print, bringing up local brightness while preserving contrast and color appearance. This ends up being much less objectionable than other manipulations tested.

The highlight mitigation method can be described by the following formula:

$$L' = \frac{mL - V}{k}$$

where:
L'=adjusted value for pixel
L=original value for pixel
V=veiling glare $$m = 1 \text{ when } L_{low} \geq V_{avg}, \min\left(\frac{V_{avg}}{L_{low}}, \frac{V_{avg} + k}{L_{high}}\right) \text{ otherwise}$$

$V_{avg}$=local average Y of veiling glare
$L_{low}$=minimum local Y value
$L_{high}$=maximum local Y value
k=headroom value, ≥1.0

Target image values are converted to single-channel floating-point in a [0,1] range. The L low and L high value s are calculated within s mall regions of the target image used to set the local multiplier m. This down-sampled multiplier image as well as the veil image are smoothed (blurred) by a certain amount to avoid the appearance of artificial boundaries. The headroom constant k may be used to provide additional range on displays that can boost small regions to bright values, but have difficulty maintaining high total output, such as OLED devices. Settings above 1.0 will slightly dim the display everywhere that added brightness is not needed to compensate for highlights.

Example Implementation 2—Creating a Demo for Automotive Display Applications

The automotive application is a constrained subproblem that avoids the need to estimate the distances to highlight boundaries in the scene, since the rough geometry of the vehicle is known. The viewer's head position still needs to be tracked based on front-camera data. For example, Android comes with built-in calls that perform this task.

The viewer's eye position together with the camera field of view and position with respect to the display area are used to reproject bright region locations to where they are expected to appear in the reflected screen. This step is performed on a pixel-by-pixel basis in over-threshold regions of the captured image, but at a reduced resolution to maintain responsiveness. In this situation, shifts in the viewer's head position and changes in the scene behind the viewer are responded to. Some delay (ex: on the order of fraction of seconds) is acceptable.

The example implementation seeks to simulate an in-dash display roughly positioned in front of the driver.

Port/Implement Head-Tracking Method to Android

Access front-facing camera and track head/eye position in real-time, predicting movement as needed to reduce latency to zero. This may benefit from access to the motion sensors for mobile applications.

Develop/Test Method for Determining Highlight Brightness

Using front-facing camera in conjunction with ambient sensor, estimate illumination environment and compare to an HDR capture from the same (camera's) perspective. Evaluate and eliminate sources of error to the extent possible.

Determine Method for Entering Vehicle Geometry

Create simple user interface for entering rough distances and number of windows needed for demo performance.

Select Video Content for Demo

Select a simulated instrument panel, heads-up or other display content appropriate to driver's-side automotive applications.

Design and Test Reprojection Technique

Using entered vehicle window geometry and tablet position, test accuracy of head-tracking combined with reflection prediction by tracing expected (reflected) window outlines in tablet display.

Choose Appropriate Highlight Mitigation Strategy

Test and tune highlight mitigation technique in different lighting situations and choose most effective method(s).

Add Ability to Detect Passengers

Modify app behavior based on likely passenger occlusion in scenario of driver with adjacent front-seat passenger.

Example Implementation 3—Modifying Demo for Mobile Applications

Single-Viewer Head-Tracking

With input from orientation sensor and front-facing camera, track viewer's head based on likely/possible viewing configurations. Use head-size and/or eye spacing to estimate distance and associated silhouette boundary.

Digesting Motion-Sensor Input

Access motion-sensor and develop robust method for detecting "parallax shifts" in plane of display as needed for boundary distance determination. Learn to discriminate between in-plane shifts and the more common rotations that occur as a user holds the device naturally while interacting and viewing content. Use recorded front-facing video to evaluate performance of motion-tracking analysis.

Estimating Highlight Region Boundaries

Using thresholding technique, identify bright region boundaries and use perpendicular in-plane motion to estimate distances and connect contours as needed where distances are unreliable. Check against measurements.

Live Tracking

Use 3-D highlight region boundary and luminance estimates together with head-tracking to reproject contour lines in live display and test/improve accuracy. Derive confidence values from motion and camera input.

Demo Integration

Couple reflection estimates including intensity with mitigation developed for automotive demo to complete method. Test with a variety of image and video content.

Frame-Rate Tuning

Using motion data and confidence values, reduce frame-rate when reflections are not a problem or confidence is high and no head, scene or device motion is detected.

The current demo implementation consists of two C++ classes that run on a Samsung tablet device, and a Java interface with GPU code to interface with Android and the graphics hardware. Here is the list of input values to obtain prior to calling C++ classes:

(a) Static parameters such as display resolution, size, screen reflectance, front camera geometry and intrinsics (FOV, etc.)
(b) Dynamically captured image from the front camera
(c) Ambient sensor reading (assume similar view to camera)
(d) Eye position (bridge of nose) and separation (interocular distance) measured in front camera pixels
(e) Estimated distances to pixels in front camera image (from vehicle geometry and head position)
(f) The target image or video frame for display The first C++ class is GetHighlights, and its purpose is to determine the position and relative intensity of reflected highlights visible to the viewer. All of the above information is needed except for the target display image (f), which is applied in another class, HideHighlights. The GetHighlights class performs the following operations on the input:

(1) Downsample the captured front image into a low-resolution (roughly 400×400 pixel) version
(2) Determine a highlight intensity threshold based on the observed nose brightness as described in Method section
(3) Find regions of the low-resolution image above this threshold, then erode and dilate by 2 down-sampled pixels to remove small features
(4) Remap highlights by projecting them into each eye's view as seen in the reflected screen
(5) Correct reflection magnitude based on ambient sensor reading, screen reflectance, and average brightness of highlights It is not assumed the front camera image is HDR or even calibrated in any useful way. In fact, many of the highlight regions may be clipped to the maximum image value. The normalization in step (5) is specifically designed to compensate for this lack of calibration, substituting the absolute value from the ambient sensor and inferring that most of the measured light is represented somewhere in the image, even if it shows only as white. By scaling the highlights by the ambient sensor reading, the recorded highlights are obtained back into roughly the correct range. The only assumption is that the exposure is bright enough to track the user's eye positions and dim enough that everything else is not completely blown out. In cases where there is nothing significantly above the brightness of the viewer's face, no highlights will be returned and the loop can be paused until the ambient sensor detects a change in the lighting.

The result produced by the GetHighlights class is a low-resolution image matching the display's aspect ratio with the highlights the viewer is expected to see reflected at the moment the front image was captured. This estimated highlight image then gets passed along with the target display image (f) to the HideHighlights class to perform the following steps:

(6) Compute a multiplier at each display pixel that brightens up the image enough to subtract the offending highlights as described in Method section
(7) Subtract the highlight image from the target display image after multiplication For step (6), how pixel values translate to absolute luminance on the display needs to be known. This should be determined by the brightness setting available in Android, but there seems to be a complex, dynamic relation between this setting and the actual pixel luminances on the OLED display.

The final operation (7) is the only one performed at full display resolution, but can be sped up easily enough by employing the GPU.

Several alternative embodiments and examples have been described and illustrated herein. The embodiments of the invention described above are intended to be exemplary only. A person skilled in the art would appreciate the features of the individual embodiments, and the possible combinations and variations of the components. A person skilled in the art would further appreciate that any of the embodiments could be provided in any combination with the other embodiments disclosed herein. It is understood that the invention may be embodied in other specific forms without departing from the central characteristics thereof. The present examples and embodiments, therefore, are to be considered in all respects as illustrative and not restrictive, and the invention is not to be limited to the details given herein. Accordingly, while specific embodiments have been illustrated and described, numerous modifications come to mind without significantly departing from the scope of the invention as defined in the appended claims.

As used in this specification and claims, the terms "e.g.," "for example," "for instance," "such as," and "like," and the verbs "comprising," "having," "including," and their other verb forms, when used in conjunction with a listing of one or more components or other items, are each to be construed as open-ended, meaning that the listing is not to be considered as excluding other, additional components or items. Other terms are to be construed using their broadest reasonable meaning unless they are used in a context that requires a different interpretation. In addition, the term "and/or" is to be construed as an inclusive OR. Therefore, for example, the phrase "A, B, and/or C" is to be interpreted as covering all of the following: "A"; "B"; "C"; "A and B"; "A and C"; "B and C"; and "A, B, and C."

The invention claimed is:

1. A method for compensating for reflection on a display device, the method comprising:
capturing one or more images of a scene facing the display device;
identifying from the captured images one or more reflection-inducing zones located within the scene facing the display device;
receiving one or more predefined properties of one or more light-generating objects located within the scene, the one or more predefined properties being measured and stored prior to the capturing the one or more images of the scene facing the display device;
matching one or more of the reflection-inducing zones to corresponding one or more of the light generating object(s);
determining specular reflection effect on the display device caused by the reflection-inducing zones and based on the one or more predefined properties of the corresponding light-generating object(s), wherein at least one of the one or more predefined properties of the light-generating object(s) is both measured prior to capturing the one or more images of the scene facing the display device and used to determine the specular reflection effect on the display device caused by the reflection-inducing zones located within the scene facing the display device; and adjusting a target image to be displayed on the display device based on the determined specular reflection effect.

2. The method of claim 1, wherein the one or more predefined properties of the light-generating object(s) comprise one or more of location, predefined luminance values, and size of each light-generating object.

3. The method of claim 2, further comprising determining a distance of one or more of the light-generating object(s) from the display device based on the one or more predefined properties of the light-generating object(s).

4. The method of claim 1, wherein the light-generating object(s) are object(s) of a cabin of an automobile and wherein the display device is located at a fixed position inside the cabin of the automobile.

5. The method of claim 1, wherein a location of the at least one light-generating object is specified or indicated by the one or more predefined properties and the location of the at least one light-generating object is fixed relative to the display device.

6. A computer-implemented system comprising:
at least one data storage device; and
at least one processor operably coupled to the at least one data storage device, the at least one processor being configured for:
capturing one or more images of a scene facing the display device;
identifying from the captured images one or more reflection-inducing zones located within the scene facing the display device;
receiving one or more predefined properties of one or more light-generating objects located within the scene, the one or more predefined properties being measured and stored prior to the capturing the one or more images of the scene facing the display device;
matching one or more of the reflection-inducing zones to corresponding one or more of the light generating object(s);
determining specular reflection effect on the display device caused by the reflection-inducing zones and based on the one or more predefined properties of the corresponding light-generating object(s), wherein at least one of the one or more predefined properties of the light-generating object(s) is both measured prior to capturing the one or more images of the scene facing the display device and used to determine the specular reflection effect on the display device caused by the reflection-inducing zones located within the scene facing the display device; and
adjusting a target image to be displayed on the display device based on the determined specular reflection effect.

7. The system of claim 6, wherein the one or more predefined properties of the light-generating object(s) comprise one or more of location, predefined luminance values, and size of each light-generating object.

8. The system of claim 7, further comprising determining a distance of one or more of the light-generating object(s) from the display device based on the one or more predefined properties of the light-generating object(s).

9. The system of claim 6, wherein the light-generating object(s) are object(s) of a cabin of an automobile and wherein the display device is located at a fixed position inside the cabin of the automobile.

10. The system of claim 6, wherein a location of a of the at least one light-generating object is specified or indicated by the one or more predefined properties and the location of the at least one light-generating object is fixed relative to the display device.

11. A method for compensating for reflection on a display device, the method comprising:
capturing one or more images of a scene facing the display device;
identifying from the captured images one or more reflection-inducing zones located within the scene facing the display device;
matching one or more of the reflection-inducing zones to one or more corresponding light-generating objects, wherein a first one of the one or more corresponding light-generating is fixed relative to the display device;
determining specular reflection effect on the display device caused by the reflection-inducing zones and based on predefined location information that is used to determine a location or a distance of the first corresponding light-generating object, wherein the predefined location information is predefined prior to the capturing the one or more images of the scene facing the display device; and
adjusting a target image to be displayed on the display device based on the determined specular reflection effect.

12. The method of claim 11, wherein the display device is located at a fixed position inside a cabin of an automobile.

13. The method of claim 12, wherein the first corresponding light-generating object is located at a fixed position inside the cabin of the automobile.

14. The method of claim 13, wherein the predefined location information specifies information usable to determine a fixed relative location or distance between the first corresponding light-generating object and the display device.

15. The method of claim 11, wherein the image capture device is located at a fixed position inside a cabin of an automobile.

16. The method of claim 11, wherein the light-generating object(s) are objects of a cabin of an automobile and wherein the display device is located at a fixed position inside the cabin of the automobile.

17. The method of claim 11, wherein the predefined location information specifies information usable to determine a fixed relative location or distance between the first corresponding light-generating object and the display device.

* * * * *